United States Patent [19]

Citti et al.

[11] 4,082,855
[45] Apr. 4, 1978

[54] PROCESS FOR PRODUCING A FRENCH FRIED POTATO PRODUCT

[75] Inventors: James E. Citti, St. Louis Park; Carl S. Dienst, Edina, both of Minn.

[73] Assignee: Ore-Ida Foods, Inc., Boise, Id.

[21] Appl. No.: 370,430

[22] Filed: Jun. 15, 1973

[51] Int. Cl.² ............... A23L 1/27; A23L 1/10; A23B 4/04
[52] U.S. Cl. .................. 426/250; 426/550; 426/637; 426/438; 426/441; 426/444; 426/516; 426/808
[58] Field of Search ............... 426/346, 347, 438–441, 426/443, 444, 516, 517, 152, 141, 144, 145, 205, 285, 370, 372, 250, 524, 550, 559, 560, 808; 425/461, 465

[56] References Cited

U.S. PATENT DOCUMENTS

| | | | |
|---|---|---|---|
| 3,027,258 | 3/1962 | Markatis | 426/347 |
| 3,076,711 | 2/1963 | Gerkens | 426/441 |
| 3,085,020 | 4/1963 | Backinger | 426/372 |
| 3,150,978 | 9/1964 | Campfield | 426/458 |
| 3,163,546 | 12/1964 | Pader | 426/372 |
| 3,190,755 | 6/1965 | Peden | 426/346 |
| 3,282,201 | 11/1966 | Wong | 426/347 |
| 3,391,005 | 7/1968 | Babigan | 426/438 |
| 3,399,062 | 8/1968 | Willard | 426/346 |
| 3,451,822 | 6/1969 | Fast | 426/346 |
| 3,519,432 | 7/1970 | Succo | 426/145 |
| 3,539,356 | 11/1970 | Benson | 426/439 |
| 3,812,274 | 5/1974 | Weaver | 426/441 |

OTHER PUBLICATIONS

Potato Processing, Talburt & Smith, 2nd Ed., 1967, Aui Publishing Co., Westport, Conn. p. 412.
Potato Processing Mold, Talburt & Smith, Aui Publishing Co., Westport, Conn. 1967, p. 13.

*Primary Examiner*—Norman Yudkoff
*Assistant Examiner*—Martin G. Mullen
*Attorney, Agent, or Firm*—Mallinckrodt & Mallinckrodt

[57] ABSTRACT

An elongate potato product simulating a French fry and provided with a plurality of serrated, longitudinal ridges alternating with longitudinal valleys, is formed by extrusion of a potato mix through a suitable die. The serrations of the ridges provide a multiplicity of individual projections more or less resembling spicules, which are completely exposed to hot fat during initial frying of the product prior to freezing and to applied heat during reconstitution of the frozen product. This results in French fries of superior quality. The spicules are a result of proper consistency of the mix and configuration of the extrusion die.

6 Claims, 5 Drawing Figures

PROCESS FOR PRODUCING A FRENCH FRIED POTATO PRODUCT

RELATED APPLICATION

The present application is related to an application for design patent filed in the United States Patent Office on Mar. 26, 1971 by these same applicants, which application has issued as U.S. Patent No. D-229,250.

BACKGROUND OF THE INVENTION

1. Field

The invention is in the field of commercial production of French fries for packaging and sale, usually as a wholly or partially pre-cooked product marketed in deep-frozen condition.

2. State of the Art

French fries of the general type concerned are well known as a commercial product. Efforts of producers have been directed toward achieving a visually appealing and palatable product for offering to retail consumers in supermarkets and the like and for use by restaurants and institutional consumers in providing tasty potato servings. It has been recognized that the manner in which the French fries are browned in frying plays an important part in both appearance and palatability, and, in an effort to achieve satisfaction from these standpoints, an extruded French fry has heretofore been produced having alternate ridges and valleys extending longitudinally of the product. The valleys afford free flow of the frying fat along the lengths of the French fries during frying, but do not provide maximum crispness and other desirable characteristics in the fried product. Heretofore, any natural cracking of the ridges transversely of their lengths has been regarded as undesirable and has been avoided as much as possible.

SUMMARY OF THE INVENTION

In accordance with the present invention, the ridges of an extruded French fry are purposely broken so as to form respective series of projections. To accomplish this, the consistency of a mashed potato extrusion dough is controlled by limiting its moisture content, preferably by utilizing both mashed blanched potatoes and dehydrated potatoes along with an emulsifier, and by extruding the dough in hot condition through a special die. The extrusion opening of the die has the general formation of a Maltese cross. The product has superior browning and crisping characteristics compared to corresponding products of the prior art.

THE DRAWING

The best mode presently contemplated of carrying out the invention is shown in the accompanying drawing, in which:

FIG. 1 represents a perspective view of a typical French fry in accordance with the invention;

FIG. 2, a view in side elevation;

FIG. 3, a view in transverse section taken on the line 3—3 of FIG. 2;

FIG. 4, a view in front elevation of an extrusion die used for the production of the French fry of FIGS. 1-3; and FIG. 5, a view in horizontal section taken on the line 5—5 of FIG. 4.

DETAILED DESCRIPTION OF THE ILLUSTRATED EMBODIMENT

Figure 4:
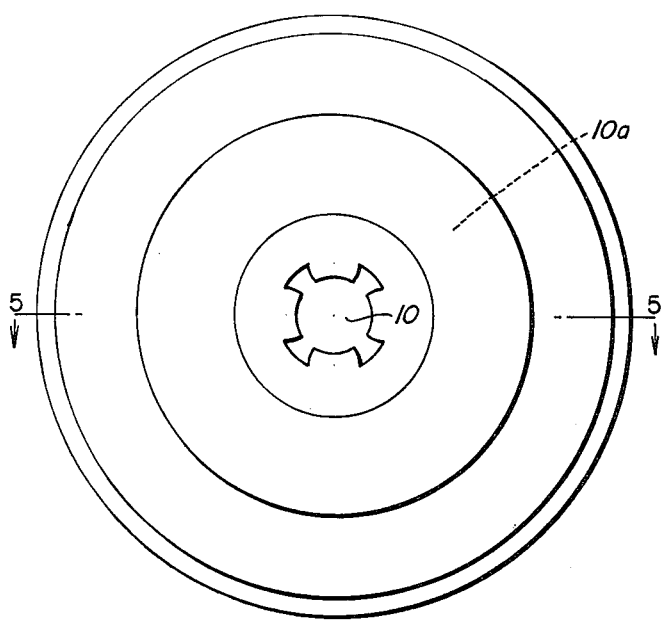
Figure 5:
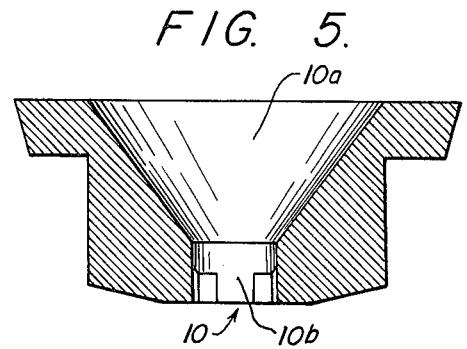

The illustrated French fry is produced by extrusion of a suitable potato dough through the die of FIGS. 4 and 5.

The dough is prepared by mixing mashed blanched potatoes with an emulsifier and by limiting its moisture content to an extent sufficient for adhesion and product formation purposes (usually 60 percent or above by weight), but substantially no greater than 75 percent. This reduced moisture content is preferably attained by including in the mix sufficient dehydrated potatoes to bring about the desired reduction of the normal moisture content of the blanched potatoes, although it may also be attained by partially dehydrating blanched potato slices prior to mashing them in the preparation of the desired dough.

In the preferred procedure, sliced raw potatoes are blanched, by steaming or the like, and are mashed by passing the blanched slices through a potato ricer, e.g. one having perforations 3/16 of an inch in diameter. The resulting riced potatoes are then mixed with dehydrated potatoes in relative proportions that depend upon the initial moisture content of the riced potatoes. In general, from 70 to 95% by weight of the riced potatoes are mixed with from 5 to 30% of the dehydrated potatoes. An amount of emulsifier within the range of from about 0.2 to 2.0% by weight of the total mix is used. It should be noted that the dehydrated potatoes often contain about 0.9% emulsifier in and of themselves and that this should be considered in arriving at the amount of emulsifier to be added, if any, in a given instance. Other additives, such as flavoring and color control ingredients, may also be used in relatively small amounts, depending upon desired taste and appearance.

The dehydrated potatoes are preferably prepared by granulating the usual commercial potato flakes. Thus, such flakes may be passed through equipment of the type of the well-known Urschel "Comitrol" equipped with a forty one thousandth of an inch head, so as to produce granulated potato flakes of mixed sieve sizes, the greater part of which will be retained on an 80 mesh screen.

A very satisfactory potato dough for extrusion in accordance with the present invention has the following formulation:

| Ingredients | Percent by Weight |
| --- | --- |
| Riced blanched potatoes | 87.7 |
| Granulated potato flakes (containing 0.9% emulsifier) | 10.8 |
| Emulsifier added | 0.3 |
| Coloring and flavoring ingredients | 1.2 |

The emulsifier can be any of those commonly employed by the industry, e.g. glycerol monostearate, xanthan gum, etc., or a combination of two or more.

Utilizing an extrudable potato dough whose moisture content is limited as indicated above and including an emulsifier, a unique French fry product is obtained when the dough is extruded at well above normal room temperature through a die whose cavity has the general form of a Maltese cross. Such a die is shown in FIGS. 4 and 5, with its product-forming cavity designated 10, the inlet being of funnel formation 10a leading into the forming cavity 10b. As shown and in accordance with recognized Maltese cross formation, the arms 10c of the cross are divergent outwardly and their outer ends have acute angle corners.

The dough should be extruded hot, rather than in the usual chilled condition. A temperature range of from about 100° F. to 175° F. is within present contemplation, but a range of from 120° F. to 160° F. is more usual. A temperature of 150° F. is presently considered the optimum for the specific formulation given above.

Figure 1:
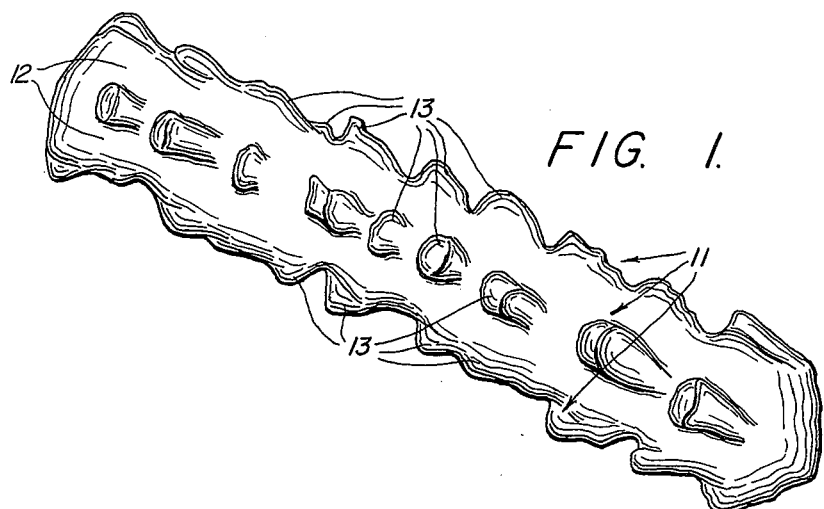
Figure 2:
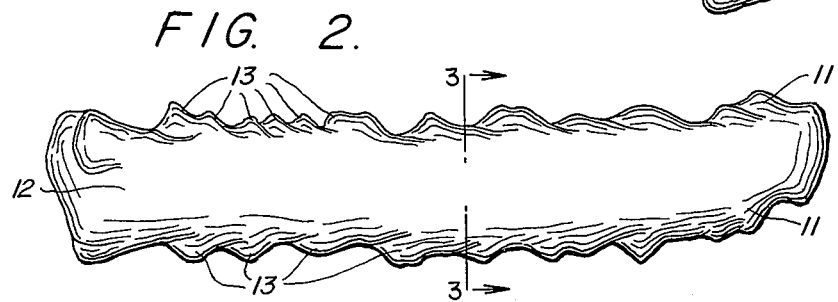
Figure 3:
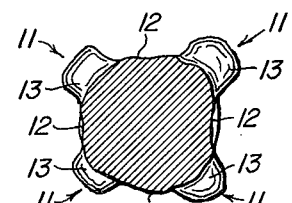

During the extrusion process, the dough is shaped into an elongate potato product simulating a French fry, see FIGS. 1–3, the extrusion having a plurality of serrated ridges 11 alternating with longitudinal valleys 12, both extending longitudinally of the product. The serrations of such ridges provide a multiplicity of individual projections 13 more or less resembling spicules, which are wholly surrounded by cooking fat in the deep frying process and enhance the crispness, flavor, and color of the final product whether such product is obtained by frying in deep fat immediately following extrusion or whether obtained sometime thereafter by oven reconstitution of initially partially fried extrusions that are subjected to freezing for sale as a commercial food item.

Whereas this invention is here illustrated and described with particular reference to an embodiment representing the best mode presently contemplated of carrying it out in practice, it is to be understood that such embodiment merely exemplifies the invention and that its scope is defined by the claims that follow.

We claim:

1. A process for producing an elongate potato product simulating a French fry but having superior crispness, comprising preparing an extrudable potato dough containing mashed blanched potatoes and an emulsifier and having a moisture content within the range of about 60% to about 75% by weight; extruding said dough in hot condition within a temperature range of about 100° F. to about 175° F. through a die having a cavity in approximately the form of a Maltese cross wherein the arms of the cross diverge in their extension outwardly and their outer ends have acute angle corners, so as to produce an elongate extrusion having a plurality of longitudinal ridges alternating with longitudinal valleys, said ridges breaking transversely of their lengths at frequent intervals during extrusion to provide serrations therealong as a multiplicity of individual projections; and frying the extrusion.

2. A process in accordance with claim 1, wherein the emulsifier constitutes by weight from about 0.20 to about 2.0% of the potato dough.

3. A process in accordance with claim 2, wherein flavoring and coloring additives are also present in the potato dough to the extent of approximately 1.2% by weight.

4. A process in accordance with claim 1, wherein the moisture content of the potato dough is affected by including dehydrated potatoes in addition to the mashed blanched potatoes in the dough so as to reduce the moisture content of the latter.

5. A process in accordance with claim 4, wherein the potato content of the dough is prepared by mixing mashed blanched potatoes and granulated dehydrated potatoes, the amount of the former being approximately within the range of from 70 to 95% by weight of the mix and the amount of the latter being approximately within the range of from 30 to 5% by weight of the mix.

6. A process in accordance with claim 1, wherein the fried extrusions are subsequently frozen.

* * * * *